United States Patent
Sanemitsu

[11] Patent Number: 5,825,014
[45] Date of Patent: Oct. 20, 1998

[54] IC CARD

[75] Inventor: Yoshikado Sanemitsu, Tokyo, Japan

[73] Assignee: Mitsubishi Denki Kabushiki Kaisha, Tokyo, Japan

[21] Appl. No.: 715,817

[22] Filed: Sep. 19, 1996

[30]     Foreign Application Priority Data

May 28, 1996 [JP] Japan .................................. 8-133764

[51] Int. Cl.⁶ .................................................. G06K 19/06
[52] U.S. Cl. .......................................... 235/492; 235/487
[58] Field of Search .................................. 235/492, 487

[56]                 References Cited

U.S. PATENT DOCUMENTS

| 5,047,988 | 9/1991 | Mizuta | 235/492 |
| 5,138,142 | 8/1992 | Sanemitsu | 235/492 |

FOREIGN PATENT DOCUMENTS

| 63-146114 | 6/1988 | Japan . |
| 2-293917 | 12/1990 | Japan . |
| 3-97761 | 10/1991 | Japan . |

OTHER PUBLICATIONS

Dual Damascene; A ULSI Wiring Technology Jun. 11–12, 1991 VMIC Conference TH–0359–0/91/0000–0144 $01.00 C 1991 IEEE, Carter W. Kaanta, et al, pp. 144–152.

*Primary Examiner*—Harold Pitts

[57]                 ABSTRACT

An IC card, including a first semiconductor device and a second semiconductor device which obtain power from an information processing device, includes a switching circuit including (a) a resistor which is coupled between a power supply line and the second semiconductor device so that the power voltage is applied to the second semiconductor device gradually, (b) a voltage detection circuit for monitoring the voltage applied to the second semiconductor device, and (c) a transistor which is turned on by a detection signal produced at the voltage detection circuit when the voltage applied to the second semiconductor device exceeds a predetermined value.

10 Claims, 6 Drawing Sheets

IC CARD

BACKGROUND OF THE INVENTION

1. Field of the Invention

The present invention generally relates to an IC card, more particularly to an IC card which reduces a rush current when it is connected to an information processing device.

2. Description of the Prior Art

Figure 6:
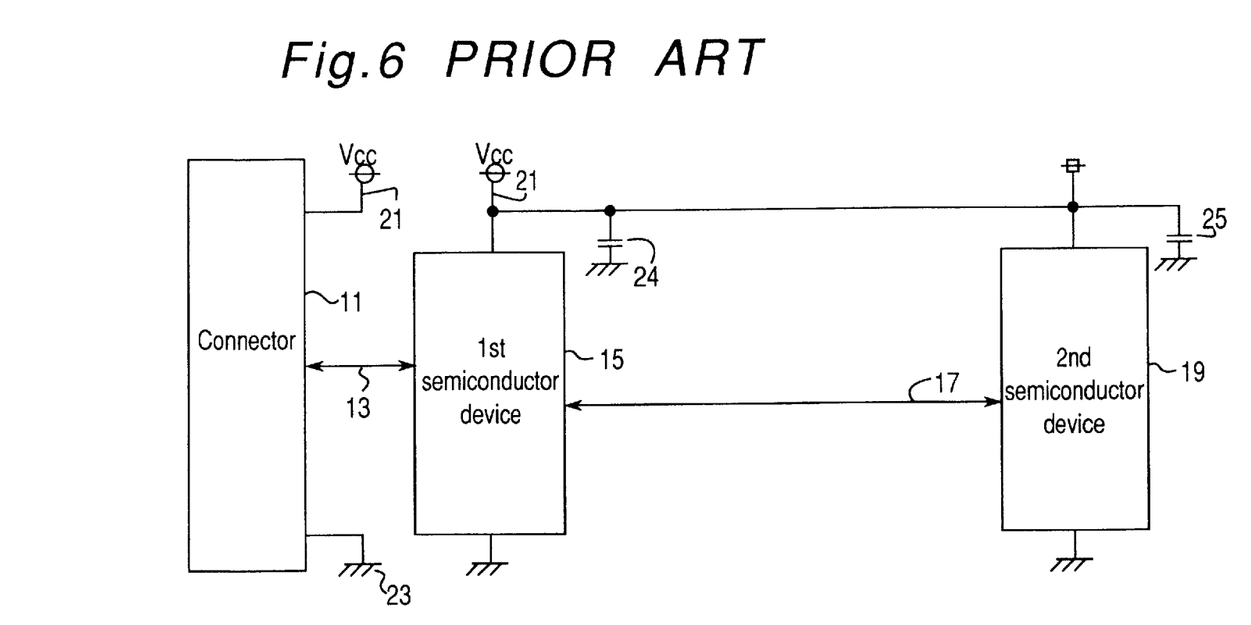
FIG. 6 shows a block diagram of a conventional IC card.

FIG. 6 shows a circuit diagram of a conventional IC card. The IC card includes a connector portion 11 which exchanges data with an external information processing device, a first semiconductor device 15 which is connected to the connector portion 11 through a signal line 13, a second semiconductor device 19 which is connected to the first semiconductor device 15 through a signal line 17. The connector portion 11, the first semiconductor device 15, and the second semiconductor device 19 are connected to a power supply Vcc through a power line 21 and also connected to the ground 23 which provides a base voltage. Capacitors 24 and 25 couple the power line 21 with the ground 23 in order to smooth the power supply voltage Vcc applied to the first and second semiconductor devices 15 and 19 respectively.

When the IC card is connected to an information processing device, the information processing device provides circuits of the IC card with the power supply voltage through the connector portion 11. Once the power supply voltage is provided, the first semiconductor device 15 sends a signal through the signal line 17 to activate the second semiconductor device 19 and thereby the IC card.

As described above, when the IC card is connected to an information processing device, power is provided to the circuits of the IC card through the connector 11 from the information processing device so that the power supply voltage is applied to the first and second semiconductor devices. In this instance, a rush current instantaneously flows through capacitors 24 and 25. Therefore, if the information processing device does not have a power supply large enough to allow the rush current to flow, the power supply voltage temporarily drops, which may cause the information processing device to malfunction.

SUMMARY OF THE INVENTION

An object of the present invention, therefore, is to resolve the aforementioned problem, that is, to provide an IC card capable of preventing a temporary drop of the power supply voltage of an information processing device, which is caused by a rush current, when the IC card is connected to the information processing device.

The IC card according to the present invention comprises at least a first semiconductor circuit and a second semiconductor circuit which obtain their power supply voltage through a power supply line from an information processing device when the IC card is connected to the information processing device. The IC card includes a switching means, connected to the second semiconductor circuit on one end and to the power supply line on the other, which connects the second semiconductor circuit with the power supply line when the switching means is turned on so that the power supply voltage is applied to the second semiconductor circuit.

The switching means is turned off immediately after the IC card is connected to the information processing device. The switching means either separates the second semiconductor circuit from the power supply line or connects the second semiconductor circuit to the power supply line with a high impedance component. At this point in time, the power supply voltage from the information processing device is applied to the first semiconductor circuit but not to the second semiconductor circuit. Then, when the switching means is turned on, it connects, with a low impedance, the second semiconductor circuit to the power supply line and allows the power supply voltage to be applied to the second semiconductor circuit. Thus, the switching means allows the power supply voltage to be applied to the first and second semiconductor circuits at different points in time.

The switching means of the aforementioned IC card preferably includes (a) a high impedance resistor means which couples the second semiconductor circuit with the power supply line so that the voltage applied to the second semiconductor circuit through the power supply line rises gradually, (b) a voltage detection means for monitoring the voltage applied to the second semiconductor circuit and for producing a detection signal, and (c) a switching circuit which is turned on by the detection signal when the voltage applied to the second semiconductor circuit exceeds a predetermined value in order to connect, with a low impedance, the second semiconductor circuit to the power supply line.

The resistor means of the preferred switching allows the voltage applied to the second semiconductor circuit through the power supply line to rise gradually when the IC card is connected to the information processing device. The voltage detection means monitors the voltage applied to the second semiconductor circuit through the resistor and outputs a voltage detection signal. The switching circuit, controlled by the voltage detection signal from the voltage detection means, remains off when the detected voltage is less than a predetermined value and is turned on when the detected voltage exceeds the predetermined value. The power supply voltage is applied to the second semiconductor circuit when the switching circuit comes on.

The switching means of the aforementioned IC card may include (a) a timer for producing a control signal at a predetermined point in time after the input voltage is applied, and (b) a switching circuit which is turned on by the control signal, and thereby connects, with a low impedance, the second semiconductor circuit with the power supply line, and outputs a control signal that changes signal lines between the first and second semiconductor circuits from a high impedance state in which signals are prevented from being output to an output enable state in which a "High" or "Low" level signal is produced.

The timer of the switching means mentioned above outputs a control signal in order to turn on the switching circuit at a predetermined point in time after the IC card is connected to the information processing device. The switching circuit is turned on by the control signal from the timer at a predetermined point in time after the IC card is connected to the information processing device and it allows the power supply voltage to be applied to the second semiconductor circuit. At the same time, the switching circuit outputs a control signal that changes signal lines between the first and second semiconductor circuits from a high impedance state in which signals are prevented from being output to an output enable state in which a "High" or "Low" level signal is produced thus making the IC card operative.

The switching means of the aforementioned IC card may include a switching circuit which is turned on or off by a control signal generated by the first semiconductor circuit when predetermined registers thereof are set at certain values by the information processing device.

The above switching means is off immediately after the IC card is connected to the information processing device and cuts off the connection between the second semiconductor circuit and the power supply. Then, the information processing device sets appropriate values at predetermined registers of the first semiconductor circuit which, in turn, outputs a control signal to turn on the switching means. This allows the second semiconductor circuit to obtain the power supply voltage.

The switching means of the aforementioned IC card may include a mechanical switch. This mechanical switch is off immediately after the IC card is connected to the information processing device and cuts off the connection of the second semiconductor circuit to the power supply. Then, when the mechanical switch is switched on, the power supply voltage is applied to the second semiconductor circuit.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

The embodiments of the present invention are described in detail with reference to the accompanying drawings.

Embodiment 1

Figure 1:
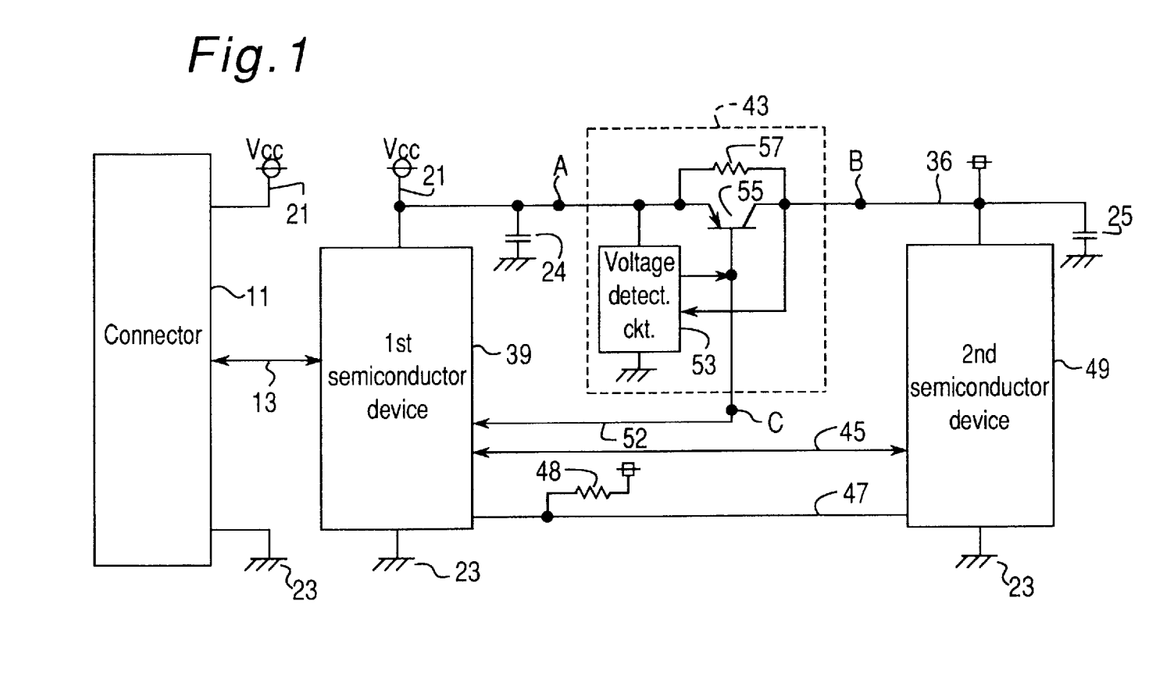
FIG. 1 shows a block diagram of the IC card according to Embodiment 1 of the present invention.

FIG. 1 shows a schematic diagram of an IC card according to Embodiment 1 of the present invention. The IC card includes a connector portion 11 which exchanges data with an external information processing device and receives power from it; a first semiconductor device 39 which is connected to the connector portion 11 through a signal line 13, to a power line 21 connected, in turn, to the power supply, and to the ground 23 which determines the base voltage; a capacitor 24 which couples the power line 21 and the ground 23; a switch circuit 43 which is connected to the power line 21, to another power line 36, and to first semiconductor device 39 through a control signal line 52; a second semiconductor device 49 which is connected to the first semiconductor device 39 through signal lines 45 and 47, to the power line 36, and to the ground 23; and another capacitor 25 which couples the power line 36 and the ground 25. Capacitors 24 and 25 provide stable voltages to the first and second semiconductor devices, respectively. The first semiconductor device 39 and capacitor 24 form a first circuit block while second semiconductor device 49 and capacitor 25 form a second circuit block.

The first semiconductor device 39 controls signal lines 45 and 47 by using the control signals from switching circuit 43 through control signal line 52. When the control signal is a "high" level signal (simply an "H"), signal lines 45 and 47 are maintained in a high impedance state (an output disable state). When the control signal is a "low" level state (simply an "L" hereinafter), however, signal lines 45 and 47 turn into an activated state in which the signal lines can accommodate "H" and "L" signals. The signal line 47 is provided to transmit an activation signal for activating the second semiconductor device 49 and is pulled up by a resistor 48. Switching circuit 43 includes a voltage detection circuit 53 which is connected to power line 21 and the ground 23; a PNP bipolar transistor 55 (referred to as the transistor hereinafter), the emitter, collector, and base of which are respectively connected to power line 21, the input terminal of the voltage detection circuit 53, and the output terminal of the voltage detection circuit 53; and a resistor 57 which couples the emitter of transistor 55 with the collector thereof. The output terminal of voltage detection circuit 53 is connected to first semiconductor device 39 through signal line 52. Voltage detection circuit 53 produces an "H" signal when an input signal is lower than a predetermined voltage (threshold), while it produces an "L" signal when an input signal is higher than the predetermined voltage. Next, the operation of the IC card of the present embodiment is described.

When the IC card is connected to an information processing device, the power supply voltage is provided to the IC card through the connector portion 11. The voltage at the point B slowly rises due to resistor 57 and capacitors 24 and 25. Accordingly the input voltage of the voltage detection circuit 53 also rises slowly. While the collector voltage of transistor 55 is lower than the threshold voltage of the voltage detection circuit 53, an "H" signal is produced by the voltage detection circuit 53, which keeps transistor 55 off. Since each of signal lines 45 and 47 has a high impedance, the power supply voltage is not applied to second semiconductor device 49 through signal lines 45 and 47. Thus, immediately after the IC card is connected to an information processing device, the power supply voltage is applied to first semiconductor device 39, capacitor 24, and voltage detection circuit 53, but not to second semiconductor device 49.

As the voltage of the point B or the collector voltage of transistor 55 rises, it exceeds the threshold voltage of the voltage detection circuit 53. Then, the voltage detection circuit 53 outputs an "L" signal, which turns on transistor 55. Accordingly power lines 21 and 36 are connected with each other through the transistor with a low impedance and have approximately the same voltage. Thus second semiconductor device 49 is provided with the power supply voltage. At the same time first semiconductor device 39 receives an "L" signal from switching circuit 43 through control signal line 52, which prompts semiconductor device 39 to switch the state of each of signal lines 45 and 47 from the high impedance state to an output enable state in which the signal lines can transmit "H" and "L" signals. Then, first semiconductor device 39 outputs an activation signal through signal line 47 to activate second semiconductor device 49. This allows first semiconductor device 39 to communicate with second semiconductor device 49 and the IC card is operative.

Thus, the IC card of the present embodiment includes switching circuit 43, which has a high impedance while the switching circuit is off and connects the second circuit block with the power supply Vcc. When the IC card is connected to an information processing device, the switching circuit monitors the voltage supplied to the second circuit block, and, when the monitored voltage exceeds a threshold voltage, the switching circuit connects, with a low impedance, the second circuit block to the power supply. Therefore, when the IC card of the present embodiment is connected to an information processing device, the power supply voltage is initially applied only to the first circuit block and then the second circuit block starts to receive the power supply voltage. Thus, since the power supply voltage is applied one by one to each circuit block of the IC card, the rush current is minimized.

Figure 2A:
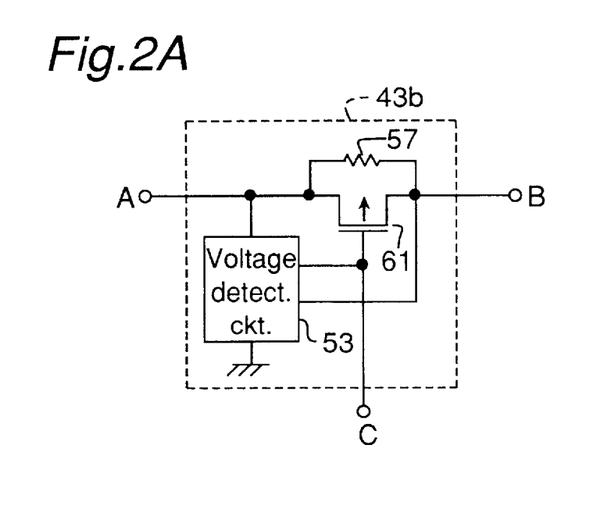
FIGS. 2A and 2B show different configurations of the switching circuit of Embodiment 1 of the present invention.
Figure 2B:
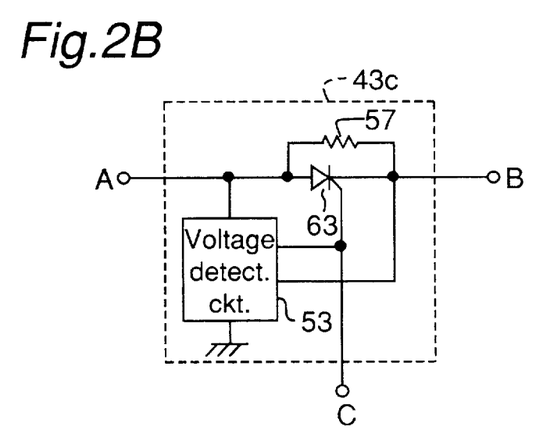

FIGS. 2A and 2B show other configurations of switching circuit 43 of the present embodiment. Switching circuit 43b shown in FIG. 2A employs a p-type MOSFET 61, as the switching element, replacing a PNP bipolar transistor 55 of switching circuit 43 of FIG. 1. Switching circuit 43c shown in FIG. 2B employs a thyristor 63, as a switching element, replacing the PNP bipolar transistor 55 of switching circuit 43 of FIG. 1. Switching circuits 43b and 43c provide the same advantages as switching circuit 43, discussed above.

Embodiment 2

Figure 3:
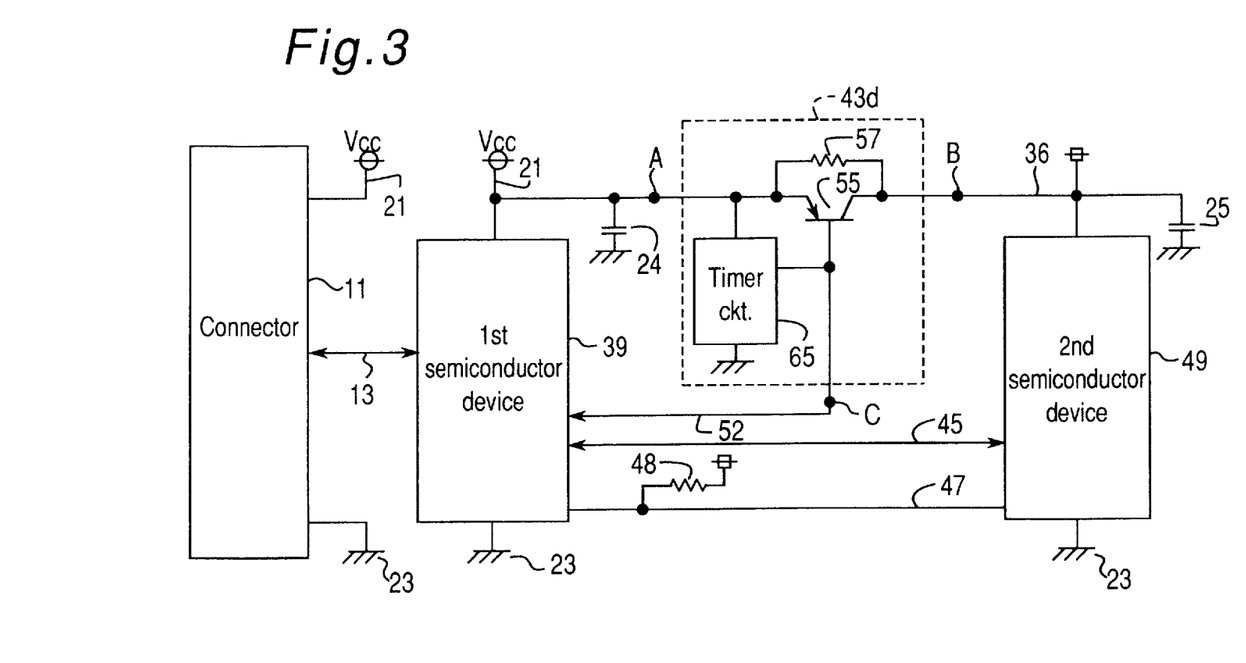
FIG. 3 shows a block diagram of the IC card according to Embodiment 2 of the present invention.

FIG. 3 shows a schematic diagram of the IC card of Embodiment 2. The IC card of the present embodiment employs a timer circuit 65 which replaces voltage detection circuit 53 of switching circuit 43 shown in FIG. 1. The remaining circuitry is the same as the circuit shown in FIG. 1. The output terminal of timer circuit 65 is connected to the base of transistor 55. Timer circuit 65 outputs an "H" signal for a predetermined period of time after the power is switched on and then an "L" signal after that period. The operation of the IC card of the present embodiment is described below.

For the predetermined period of time after the IC card is connected to an information processing device timer circuit 65 outputs an "H" signal, as mentioned above, which keeps transistor 55 off. Therefore, the voltage of the power line 36 or the voltage at the point B rises gradually depending on resistor 57 and capacitors 24 and 25. After the predetermined period, timer circuit 65 outputs an "L" signal to turn on transistor 55 causing the voltages of the power lines 21 and 36 to be almost equal. Now the second circuit block is supplied with the power voltage. The "L" control signal also prompts first semiconductor device 39 to change the states of signal lines 45 and 47 from the high impedance state to the activated state as in Embodiment 1, which causes the IC card to become activated. Thus, the IC card of the present embodiment employs switching circuit 43d, including timer circuit 65, which allows the power voltage to be supplied to the first circuit block first and to the second circuit block after the predetermined period. Since the power supply voltage is applied one by one to each circuit block, the rush current is minimized.

The present embodiment, as in Embodiment 1, may utilize a MOSFET or a thyristor as a switching device for switching circuit 43d in place of the PNP bipolar transistor 55. The replacement produces the same effects.

Embodiment 3

Figure 4:
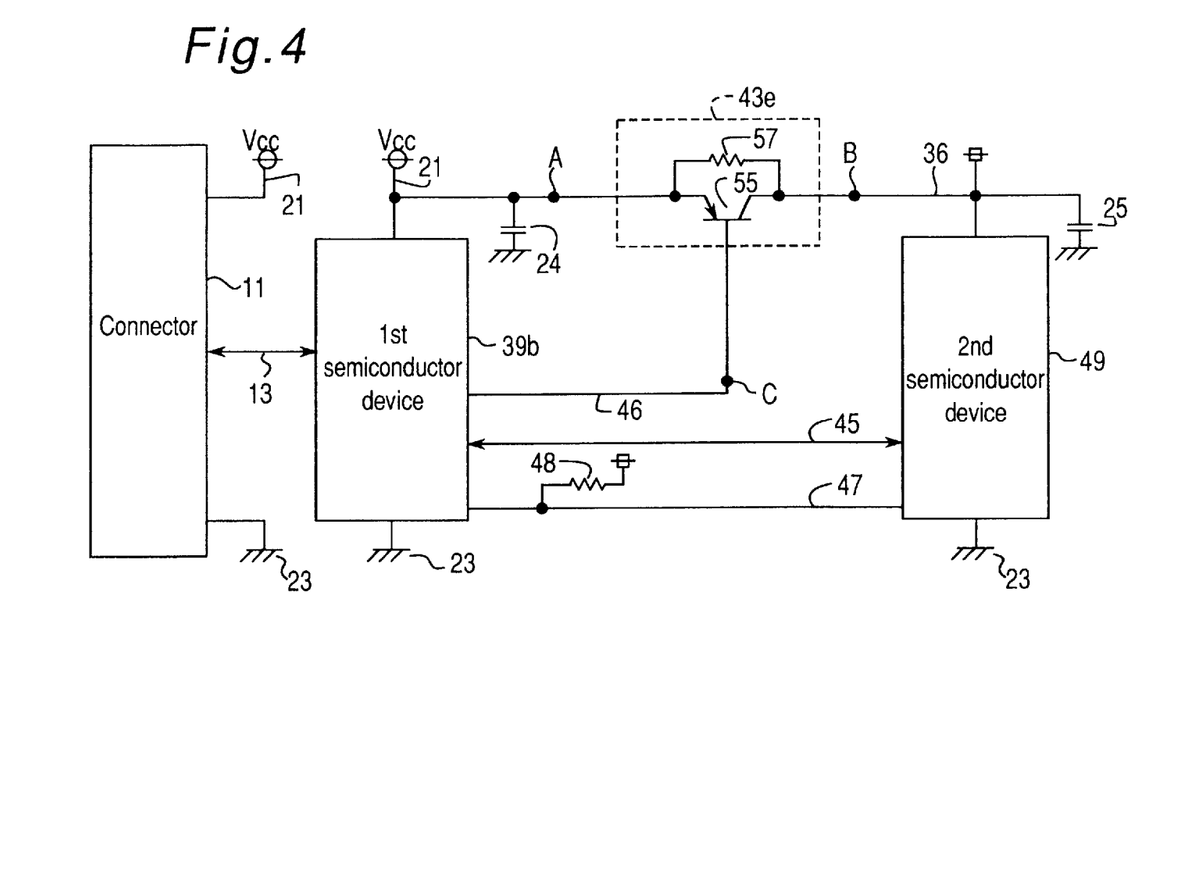
FIG. 4 shows a block diagram of the IC card according to Embodiment 3 of the present invention.

FIG. 4 shows a schematic diagram of the IC card of Embodiment 3 of the present invention. The IC card of the present embodiment includes a connector portion 11 which exchanges data with an external information processing device; a first semiconductor device 39b connected to connector portion 11 through a signal line 13, to a power line 21 connected, in turn, to the power supply, and to the ground 23 which determines the base voltage; a capacitor 24 which couples a power line 21 with the ground 23; a switching circuit 43e connected to power line 21, to another power line 36, and to first semiconductor device 39b through a control signal line 46; a second semiconductor device 49 connected to the first semiconductor device 39b through signal lines 45 and 47, to the power line 36, and to the ground 23; and another capacitor 25 which couples the power line 36 with the ground 23. Capacitors 24 and 25 provide stable voltages to first and second semiconductor devices 39b and 49, respectively. First semiconductor device 39b and capacitor 24 form the first circuit block while second semiconductor device 49 and capacitor 25 form the second circuit block.

The information processing device sets predetermined values at predetermined registers of the first semiconductor device 39b, which in turn outputs a control signal to switching circuit 43e through control signal line 46 to turn the switching circuit on or off. Signal line 47 is provided to transmit an activation signal for activating second semiconductor device 49 and is pulled up by a resistor 48. Switching circuit 43e includes (a) a PNP bipolar transistor 55 (referred to as the transistor hereinafter), the emitter, collector, and base of which are respectively connected to power line 21, power line 36, and the output terminal of first semiconductor device 39b through control signal line 46, and (b) a resistor 57 which couples the emitter of transistor 55 with the collector thereof.

In the present embodiment, as mentioned above, switching circuit 43e is turned on or off by the control signal sent through control signal line 46 from first semiconductor device 39b. Immediately after the IC card is connected to the information processing device, first semiconductor device 39b outputs an "H" control signal to switching circuit 43e. The "H" signal keeps switching circuit 43e off and prevents second semiconductor device 49 from obtaining a power supply voltage high enough for the second semiconductor device 49 to operate. In order to activate the IC card, the connected information processing device sets other predetermined values in the predetermined registers of first semiconductor device 39b for it to output an "L" control signal through control signal line 46 which turns on switching circuit 43e. Then power lines 21 and 36 are connected with a low impedance and have almost equal voltages. Hence high enough power is supplied to second semiconductor device 49. At the same time, each of signal lines 45 and 47 changes the state thereof from a high impedance state to an output enable state in which the signal lines can transmit "H" and "L" signals. Then, first semiconductor device 39b outputs an activation signal through signal line 47 to activate second semiconductor device 49. This allows first semiconductor device 39b to communicate with second semiconductor device 49 and the IC card is ready to be used.

Thus, the second circuit block of the IC card of the present embodiment is connected to the power supply Vcc through switching circuit 43e which is turned on or off by the information processing device which sets appropriate values at predetermined registers of the first semiconductor device 39b. Immediately after the IC card is connected to the information processing device, the second circuit block 43e is connected to the power supply Vcc through the high impedance and hence a high enough power supply voltage is not supplied to the second circuit block; only the first circuit block obtains the power supply voltage. When the information processing device requires data access to the IC card, it turns on switching circuit 43e and causes the second circuit to be connected with a low impedance to the power supply Vcc and to obtain the power supply voltage. Thus, since the power supply voltage is applied one by one to each circuit block of the IC card, the rush current is minimized.

The present embodiment, as in Embodiment 1, may utilize a MOSFET or a thyristor as a switching device for switching circuit 43e in place of the PNP bipolar transistor 55. The replacement results in the same effects.

Embodiment 4

Figure 5:
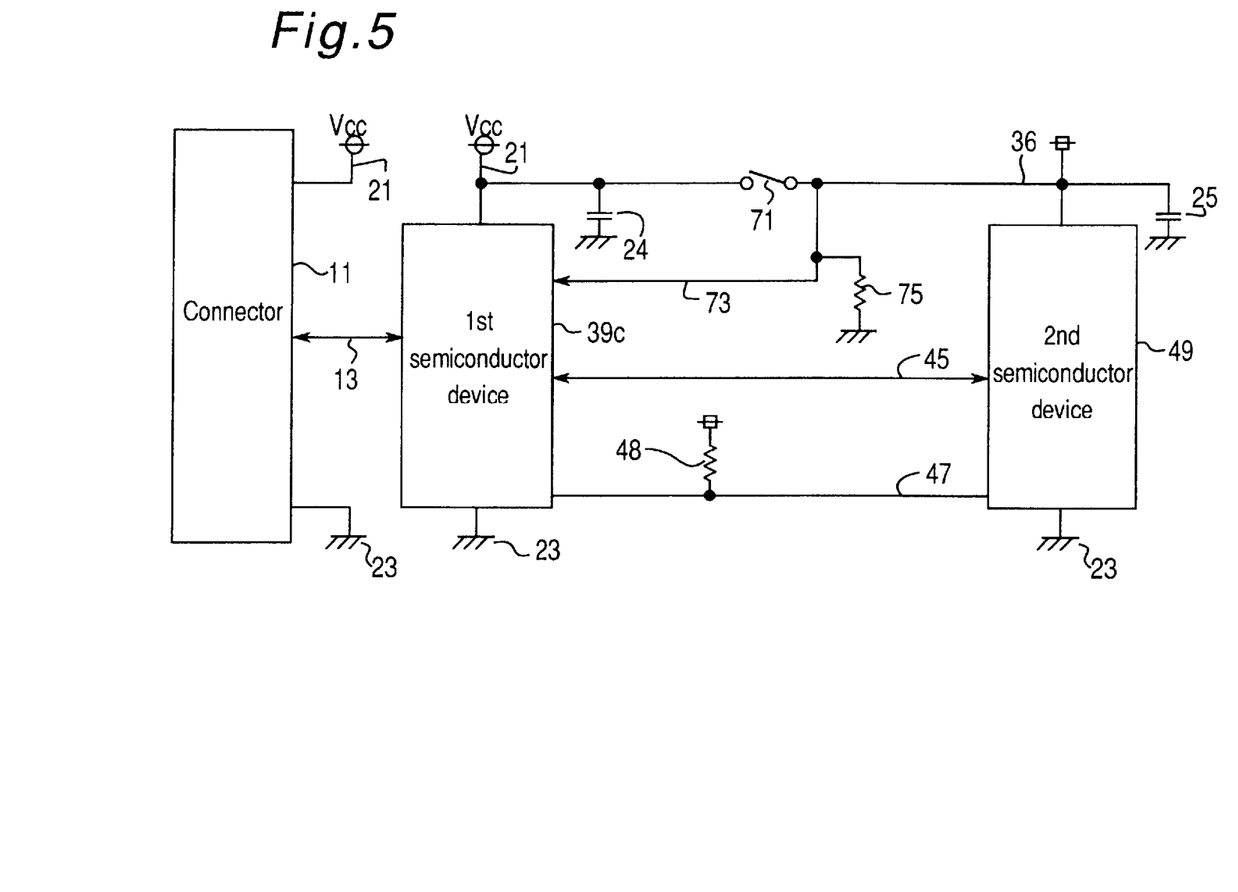
FIG. 5 shows a block diagram of the IC card according to Embodiment 4 of the present invention.

FIG. 5 shows a schematic diagram of the IC card of Embodiment 4 of the present invention. The IC card of the present embodiment includes a connector portion 11 which exchanges data with an external information processing device; a first semiconductor device 39c connected to connector portion 11 through a signal line 13, to a power line 21 connected, in turn, to the power supply Vcc, and to the ground 23 which determines the base voltage; a capacitor 24 which couples power line 21 with the ground 23; a mechanical switch 71 connected between power line 21 and another power line 36; a second semiconductor device 49 connected to first semiconductor device 39c through signal lines 45 and 47, to power line 36, and to the ground 23; and another capacitor 25 which couples power line 36 with the ground 25. Signal line 47 is provided to transmit an activation signal for activating the second semiconductor device 49 and is pulled up by a resistor 48. Capacitors 24 and 25 provide stable voltages to first and second semiconductor devices 39c and 49, respectively. First semiconductor device 39c and capacitor 24 form the first circuit block while second semiconductor device 49 and capacitor 25 form the second circuit block.

A control signal is provided to first semiconductor device 39c through control signal line 73 from one of the terminals of switch 71 that is connected to the power supply line 36 and is pulled down to the ground 23 by a pull-down resistor 75. The first semiconductor device 39c of the present embodiment controls signal lines 45 and 47 with the control signal provided through control signal line 73. That is, when the control signal is an "L", signal lines 45 and 47 stay in a high impedance (output disable) state; while when the control signal is an "H", the signal lines are in an output enable state and transmit "H" and "L" signals. The operation of the IC card of the present embodiment is described below.

The IC card of the present embodiment is manually switched on by a mechanical switch 71 at a predetermined point in time after the IC card is connected to the information processing device. The input signal provided to first semiconductor device 39c through control signal line 73 is an "L" when the switch is off because of pull-down resistor 75 and an "H" when the switch is on. The transition of the signal from an "L" to an "H" changes the states of signal lines 45 and 47 from the high impedance state to the output enable state in which the communication between first and second semiconductor devices 39c and 49 is possible. Thus, the IC card becomes operative.

The second circuit block of the IC card of the present embodiment is cut off from the power supply Vcc by the mechanical switch 71 immediately after the card is connected to the information processing device, whereas the first circuit block is connected to the power supply. When switch 71 is turned on in order to access data, the second circuit block is then connected to the power supply and is provided with the power supply voltage. Thus, since the power supply voltage is applied one by one to each circuit block of the IC card, the rush current is minimized.

The IC card according to the present invention utilizes a switching means which includes a mechanical switch or a switching circuit including a semiconductor device such as a MOS transistor and a thyristor. The switching means separates circuits of the IC card from the power supply. When the IC card is connected to an information processing device, the power supply voltage is applied one by one to each circuit so that the rush current is minimized. This scheme prevents an information processing device with a small current capacity from malfunctioning when the IC card is connected to the device.

The IC card of the present invention, in a preferred configuration, includes a switching means which monitors the voltage applied to the second circuit when the IC card is connected to an information processing device, turns itself on when the applied voltage exceeds a predetermined value, and then connects the second circuit with the power supply. This allows the power supply voltage to be applied to the first and second circuits at different points in time and reduces the rush current that flows when the IC card is connected to the information processing device.

The IC card of the present invention, in a preferred configuration, includes a switching means which comes on at a predetermined point in time after the IC card is connected to an information processing device and connects the second circuit with the power supply. This allows the power supply voltage to be applied to the first and second circuits at different points in time and reduces the rush current that flows when the IC card is connected to the information processing device.

The IC card of the present invention, in yet another preferred configuration, includes a switching means which is controlled, through the first circuit, by the information processing device. The switching means connects the second circuit to the power supply when the switching means is turned on. This allows the power supply voltage to be applied to the first and second circuits at different points in time and reduces the rush current that flows when the IC card is connected to the information processing device.

The IC card of the present invention, in another preferred configuration, includes a mechanical switch which controls the timing of the power supply voltage to be applied to the first and second circuits when the IC card is connected to an information processing device so that the power supply voltage is applied to the first and second circuits at different points in time. This reduces the rush current that flows when the IC card is connected to the information processing device.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. An IC card comprising
a connector for connecting said IC card to an information processing apparatus;
a first semiconductor circuit connected to said connector;
a second semiconductor circuit connected to said first semiconductor circuit through signal lines;
a power supply line for supplying a power voltage to said first and second semiconductor circuits which is supplied from said information processing apparatus through said connector when said IC card is connected to said information processing apparatus; and
switching means, connected between said second semiconductor circuit and said power supply line, which couples said second semiconductor circuit to said power supply line to apply the power voltage to said second semiconductor circuit when said switching means is turned on.

2. The IC card of claim 1, wherein said switching means includes, a high impedance resistor which couples said second semiconductor circuit to said power supply line to gradually raise a voltage applied to said second semiconductor circuit through said power supply line;

voltage detection means for monitoring the voltage applied to said second semiconductor circuit to output a detection signal when the voltage exceeds a predetermined value; and a switching circuit which is turned on by the detection signal to connect, with a low impedance, said second semiconductor circuit to said power supply line.

3. The IC card of claim 1, wherein said switching means includes, a timer for outputting a first control signal to said first semiconductor circuit at a predetermined timing after said IC card is connected to said information processing apparatus; and a switching circuit turned on by the first control signal, to connect, with a low impedance, said second semiconductor circuit with said power supply line, and to output a second control signal to change signal lines between said first and second semiconductor circuits from a high impedance state in which signals are prevented from being output from said first semiconductor circuit to said second semiconductor circuit to an output enable state in which a "High" or "Low" level signal is communicable.

4. The IC card of claim 1, wherein said switching means includes a switching circuit, turned on or off by a control signal generated by said first semiconductor circuit when predetermined registers thereof are set to appropriate values by said information processing device.

5. The IC card of claim 1, wherein said switching means includes a mechanical switch.

6. An IC card, comprising:

a first semiconductor circuit, connected to an information processing circuit via a connector;

a second semiconductor circuit, connected to said first semiconductor circuit;

a switching device for sequentially supplying power from a power supply line to said first semiconductor circuit and said second semiconductor circuit to prevent a drop of a power supply voltage of the information processing device.

7. The IC card of claim 6, wherein said switching device includes, a high impedance resistor which couples said second semiconductor circuit to the power supply line to gradually raise a voltage applied to said second semiconductor circuit through the power supply line;

a voltage detector for monitoring a voltage applied to said second semiconductor circuit to output a detection signal when the voltage exceeds a predetermined value; and a switch, turned on by the detection signal to connect, with a low impedance, said second semiconductor circuit to the power supply line.

8. The IC card of claim 6, wherein said switching device includes, a timer for outputting a first control signal to said first semiconductor circuit at a predetermined timing after said IC card is connected to the information processing apparatus; and a switch, turned on by the first control signal, to connect, with a low impedance, said second semiconductor circuit with the power supply line, and to output a second control signal to change signal lines between said first and second semiconductor circuits from a high impedance state in which signals are prevented from being output from said first semiconductor circuit to said second semiconductor circuit to an output enable state in which a "High" or "Low" level signal is communicable.

9. The IC card of claim 1, wherein said switching device includes a switching circuit, turned on or off by a control signal generated by said first semiconductor circuit when predetermined registers thereof are set to appropriate values by the information processing device.

10. The IC card of claim 1, wherein said switching device includes a mechanical switch.

* * * * *